INVENTOR.
CHARLES D. SNELLING

July 2, 1968  C. D. SNELLING  3,390,672
SOLAR HEATING DEVICE
Filed July 12, 1966  2 Sheets-Sheet 2

INVENTOR.
CHARLES D. SNELLING
BY
Hopgood & Calimafde
ATTORNEYS.

United States Patent Office 3,390,672
Patented July 2, 1968

3,390,672
SOLAR HEATING DEVICE
Charles D. Snelling, Allentown, Pa., assignor, by mesne assignments, to Melpar, Inc., a corporation of Delaware
Filed July 12, 1966, Ser. No. 564,577
8 Claims. (Cl. 126—271)

ABSTRACT OF THE DISCLOSURE

A solar heating system in which a heat-collecting chamber has an evaporation zone communicating with the fluid-conducting condenser of a heat exchanger via an evacuated, hermetically sealed heat-transfer fluid circulating system forming a closed path with the chamber and the exchanger. The circulating system contains a vaporizable heat-transfer fluid in a quantity in the condensed form just sufficient, when the spacing between chamber and exchanger along the closed path is considered, to flood the evaporation zone of the chamber.

---

This invention relates to solar heaters and, in particular, to a solar heating and heat exchange system and a method of utilizing solar energy.

The principal object of the invention is to provide a method of and a system for solar heating of homes and other habitable structures which is more practical than systems and methods heretofore used.

Broadly speaking, solar heaters comprise a solar heat collector which absorbs heat energy from the sun and delivers it via a heat transfer fluid into a house or to a heat storage unit. The heat collector generally comprises a black plate to absorb solar radiation, one or more air-spaced glass panes for transmitting solar radiation to the collector and for trapping the heat within it, and a circulating heat-transfer medium, e.g., water, for transferring heat from the collector to rooms in a house or to a heat storage device.

The heat collector may be in the form of a flat tank placed on top of a roof or may comprise a zig-zag arrangement of pipes in a well-insulated box covered by one or two air-spaced panes of glass. Water circulated in the pipes on the roof is heated by the sun and is accumulated in an insulated storage tank, or the pipes with the heated water may pass through a heat exchanger and the heat of the water transferred to a heat exchange fluid, such as water in a boiler or to a stream of air used to heat the home.

The foregoing systems have their limitations insofar as heat capacity is concerned in that the heat energy transferred is generally in the form of sensible heat. Assuming the heat-transfer fluid is circulating water, and the water is heated to a temperature of say 50° F. above its original temperature, this amounts to an increase in heat content due to heat absorption of 50 B.t.u.'s per pound of water. By circulating the heated water through heat-exchanger tubes, some or all of the heat is extracted. The rate at which heat is extracted will depend on the rate at which the circulating water absorbs heat, the rate of circulating water, the efficiency of the heat collector, the efficiency of the heat exchanger, etc.

Attempts to improve the foregoing types of hot water heaters have generally been in the direction of redesigning the collector to improve its heat absorbing characteristics. Another modification has been to utilize the heat pump principle in conjunction with the solar collector in which ammonia gas is employed as the heat-transfer fluid. This modification, which is described in U.S. Patent No. 1,765,136, comprises passing ammonia gas through the collector where it absorbs heat, and then adiabatically compressing the gas before it enters a heat exchange apparatus, in this case a steam boiler.

My system differs from the foregoing in that I utilize an evacuated hermetically sealed circulating system containing a heat-exchange fluid adapted to boil over a range of temperatures so long as there is a temperature difference between the temperature at the collector and the temperature at the heat exchange unit. Thus, instead of relying on only sensible heat to effect heat transfer, I am able to provide a system in which the latent heat of vaporization is utilized at any temperature to assure high heat capacity within the system so long as the temperature at the heat collector is higher than that at the heat exchanger.

The objects of my invention will be more clearly apparent from the following disclosure and the drawing, wherein.

Figure 5:
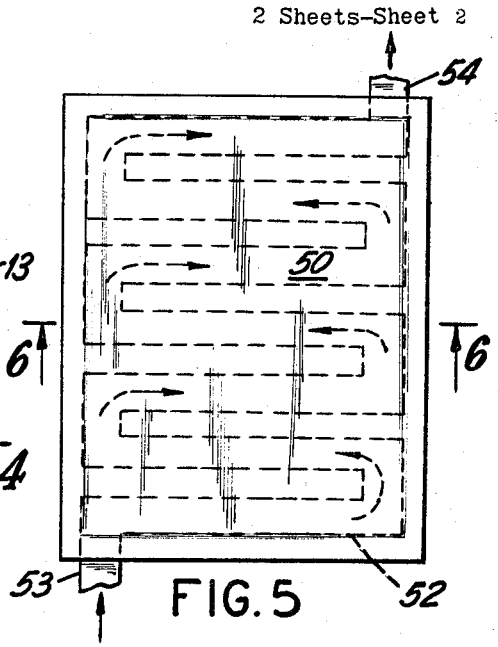
Figure 6:
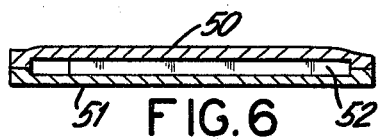
Figure 7:
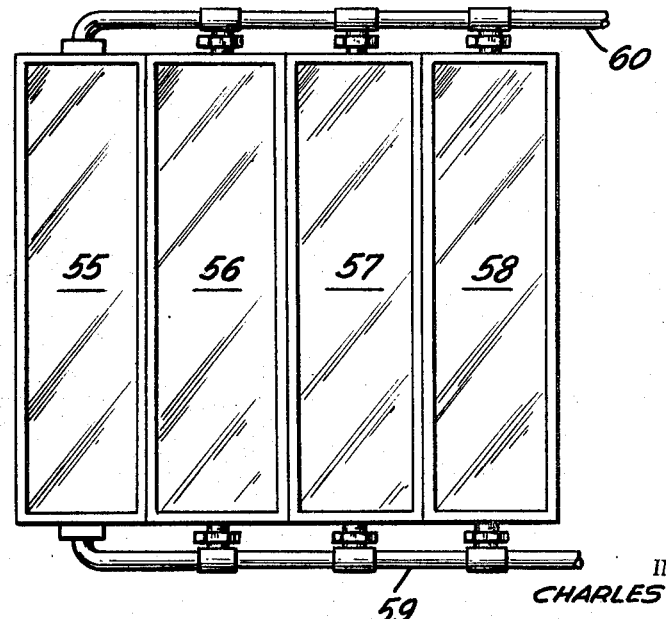

FIGS. 5 and 6 also show in plan and cross section another form of a heat collector; and FIG. 7 is illustrative of a bank of heat collectors.

My invention comprises the combination of a solar heater and a heat-exchange system consisting of a heat-collecting chamber having an evaporation zone associated therewith, a heat exchanger associated with fluid-conducting condensing means, and an evacuated heat-transfer circulating system connecting the heat-collecting chamber to the fluid-conducting condenser means in a closed path which communicates with the heat-collecting chamber. A predetermined amount of vaporizable heat-transfer fluid is hermetically sealed in the evacuated circulating system, the heat-collecting chamber being spatially disposed relative to the heat exchanger such that the contained predetermined amount of heat-transfer fluid is preferably just sufficient in the condensed form to flood the evaporation zone of the heat-collecting chamber, means being provided to insure flooding of the evaporation zone with the predetermined amount of heat-transfer fluid. Such means may comprise a pump or a gravity leg may be provided extending from the condenser, the gravity leg being disposed relative to the evaporator so as to insure flooding of the evaporator with heat-transfer fluid.

Figure 1:
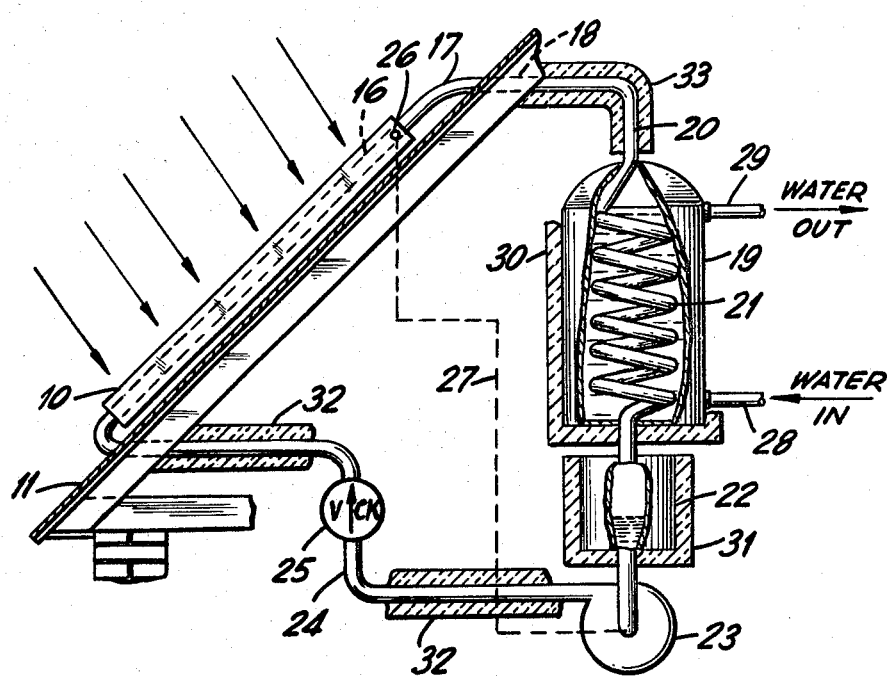
FIGS. 1 and 2 are illustrative of two apparatus embodiments for carrying out my invention.
Figure 3:
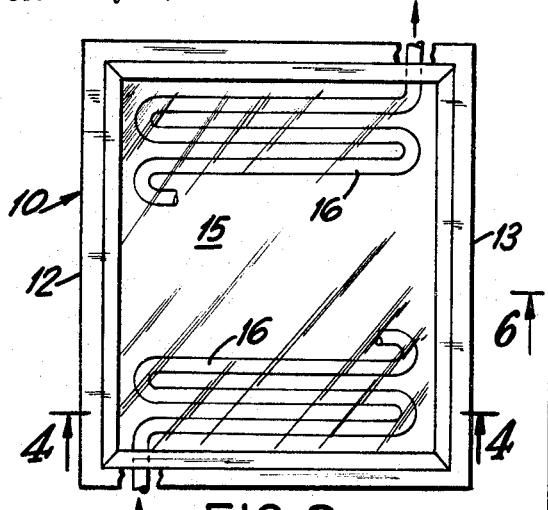
FIGS. 3 and 4 depict in plan and cross section one form of heat collector which may be used in carrying out my novel inventive concept.
Figure 4:
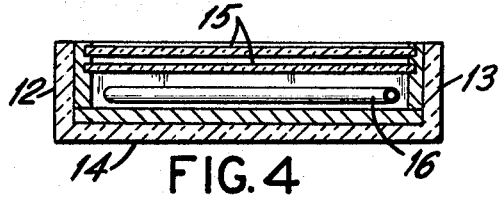

Referring to FIG. 1, I show one embodiment of a solar heating system comprising a solar collector 10 associated with roof 11, the solar collector being of the type, for example, as that shown in FIGS. 3 and 4 comprising a flat box having side walls 12, 13 (FIG. 4) and an insulated bottom 14. The side and end walls support a pair of air-spaced panes of glass 15, the box or collector having contained therein a bank of tubing 16 arranged in a tortuous path, and specifically in zig-zag fashion as shown in FIG. 3, the tubing making up the evaporation zone of the collector.

Tubing 16 is part of and coextensive with a circulatory system comprising tubing 17 emerging from the collector, passing through the roof at 18 and entering a hot water 19 at 20 in communication with coiled tubing or heat exchanger 21. The heat exchanger may be coupled to a sump 22 below the hot water tank, although a sump is not necessary. The sump is connected to a pump 23 which removes the heat-transfer fluid from the sump to the collector via tubing 24 which has a one way check valve 25 across it to prevent back flow of condensed fluid. The pump is driven by a motor which may be controlled by a conventional switch actuating means at 26 of the collector through line 27 coupled to the motor. The switch actuating means may comprise a float which actuates a micro-switch at 26, or other conventional actuating device. Where the amount of heat transfer fluid employed is just sufficient to flood the evaporator, a cut-off switch would not be necessary since the sump would be empty and there would not be any additional fluid to pump. In this connection, the pump which is generally small and operated by a one-sixteenth to one-eighth horse power motor may run continuously and need not stop.

As stated above, the circulating system is evacuated and a heat-transfer fluid added to it in a predetermined amount just sufficient to maintain a reservoir in the sump and to keep the evaporation zone of the solar collector flooded. Examples of heat-transfer fluids are those sold under the trademarks Freon 11, Freon 113, Freon 114 as well as such fluids as ethyl alcohol, ethyl ether and similar heat-transfer fluids. By hermetically sealing the fluid in the circulating system under sub-atmospheric pressure, for example under vacuum, it will develop its own equilibrium pressure at each temperature. Thus, assuming ethyl alcohol is sealed under vacuum in the system, the pressure developed in the system at, for example 60° F. as the alcohol evaporates will be about 32 mm. (about 0.6 p.s.i. absolute). If the temperature at the collector is higher than the temperature in the condensing zone, then the alcohol in the evaporating zone of the collector will boil and remove heat from the collector as latent heat of vaporization. No matter what the temperature is at the collector, so long as it is higher than the temperature in the storage tank, there will always be some boiling of fluid until the temperature of the storage tank reaches that of the collector and the system reaches equilibrium.

I prefer hermetically sealed systems having fluids with fairly low vapor pressures at temperatures upwards of about 175° F. Freon 11 is very practical in that it exhibits a vapor pressure of about 39 lbs./in.² absolute at 130° F. Freon 113 exhibits a lower vapor pressure of about 18.5 lbs./in.² at the same temperature, while Freon 114 exhibits a vapor pressure of about 73.8 lb./in.². Hermetically sealed ethyl alcohol, on the other hand, can be boiled in an evacuated system at temperatures of up to about 172° F. before it reaches a pressure of one atmosphere absolute or 14.6 lbs./in.². in the system. Some temperatures and vapor pressures (lbs./in.² absolute) of fluids which may be employed are given as follows:

VAPOR PRESSURE (LBS./IN.²)

| Temp.,° F. | Ethyl Alcohol | Ethyl Ether | Carbon Tetrachloride | Freon 11 | Freon 113 |
|---|---|---|---|---|---|
| 60 | 0.6 | 7.1 | 1.38 | 10.1 | 4.3 |
| 68 | 0.85 | 8.5 | 1.75 | 10.3 | 5.1 |
| 77 | 1.14 | 10.3 | 2.22 | | |
| 86 | 1.5 | 12.4 | 2.74 | | |
| 95 | 2.0 | 14.6 | 3.4 | 20.1 | 9.4 |
| 104 | 2.6 | 17.7 | 4.15 | | |
| 122 | 4.75 | 24.5 | 6.2 | 30.4 | 16.0 |
| 131 | 5.4 | | 7.3 | 39.1 | 18.5 |
| 140 | 6.8 | 33.2 | 8.65 | | |
| 149 | 8.65 | | 10.2 | 50.5 | 24.5 |
| 158 | 10.42 | 43.9 | 12.0 | | |
| 172 | 14.6 | | 14.0 | 70.0 | 30.2 |
| 176 | 15.6 | 57.6 | 16.1 | | |
| 194 | 23.0 | 73.8 | 21.4 | 98.0 | 50.0 |

As will be noted from the above, a fairly wide range of evaporation temperatures is possible over a fairly low range of pressures, provided the circulating system is evacuated before the heat-transfer fluid is added to the system. Thus, no matter how small the temperature difference between the collector and the condensers, so long as the collector is higher in temperature, there will always be some heat transfer since there will always be some heat transfer fluid going from liquid to vapor and back to liquid again. The sensible heat is transferred as well as the latent heat of vaporization. Such heat transfer fluids may be adapted to boil from about +50 to +250° F. at vapor pressure of about 1 to 200 lbs./in.² absolute. In the conventional devices using the convection flow of water as the heat-transfer liquid, the heat transfer at low temperature differences is quite sluggish and not as positive acting as the system of the invention.

Referring again to FIG. 1, after the requisite amount of heat transfer fluid, let us say ethyl alcohol, has been charged into the evacuated circulating system, pump 23 is started to insure flooding of collector 10 with alcohol. When the temperature at evaporator 10 exceeds that of condenser 21, the alcohol will boil and pass into the condenser to heat the water therein. Cold water is fed into tank 19 via pipe 28 at the bottom and heated water drawn off via pump at pipe 29 at the top. Assuming that the water in the tank starts off at a temperature of about 70° F. and the temperature of the collector is such as to be substantially above the water temperature, let us say about 130° F., the alcohol in the evaporating zone will boil; the vapor will pass through pipe 17 into condensing coil 21 where it will condense and give up its sensible and its latent heat to the surrounding water, and the condensed heat-transfer fluid will then flow by gravity to sump 22 from which it will be drawn by pump 23.

The circulation of the heat-transfer fluid will continue through the pump until evaporation ceases. This will occur when the temperature of the water tank reaches and is the same as that of the collector. Since no fluid is being evaporated, the pump will shut off via a signal from switch actuating means at point 26 of the evaporator. However, as stated hereinabove, a switch may not be necessary where the amount of fluid is just sufficient to flood the evaporator. It will be appreciated that in the evening, the collector may cool down below the temperature prevailing in the sump. Where this occurs and the temperature is higher in the sump, the fluid in the sump will tend to boil and its vapor flow upwards through condenser coil 21, remove heat therefrom and then condense in the cooler piping on the roof and dump the heat outside the house. To prevent the cycle from reversing itself in the evening, a check valve 25 is provided as shown in line 24. Since no circulation can take place against the valve, the cycle reversal is prevented. However, so long as the amount of fluid is just sufficient to flood the evaporator, the reverse flow of heat is prevented, since the sump would be empty. In prior art solar heaters, extra care must be taken to prevent the reverse flow of heat.

In order to prevent loss of heat in the house, it is preferred that water tank 19 be insulated. An insulation 30 is shown fragmentarily of suitable material, such as asbestos and the like. Sump 22 is likewise preferably covered with an outer sheath of insulation 31. Similarly, the pipes should be insulated as shown fragmentarily at 32, 33, etc.

Figure 2:
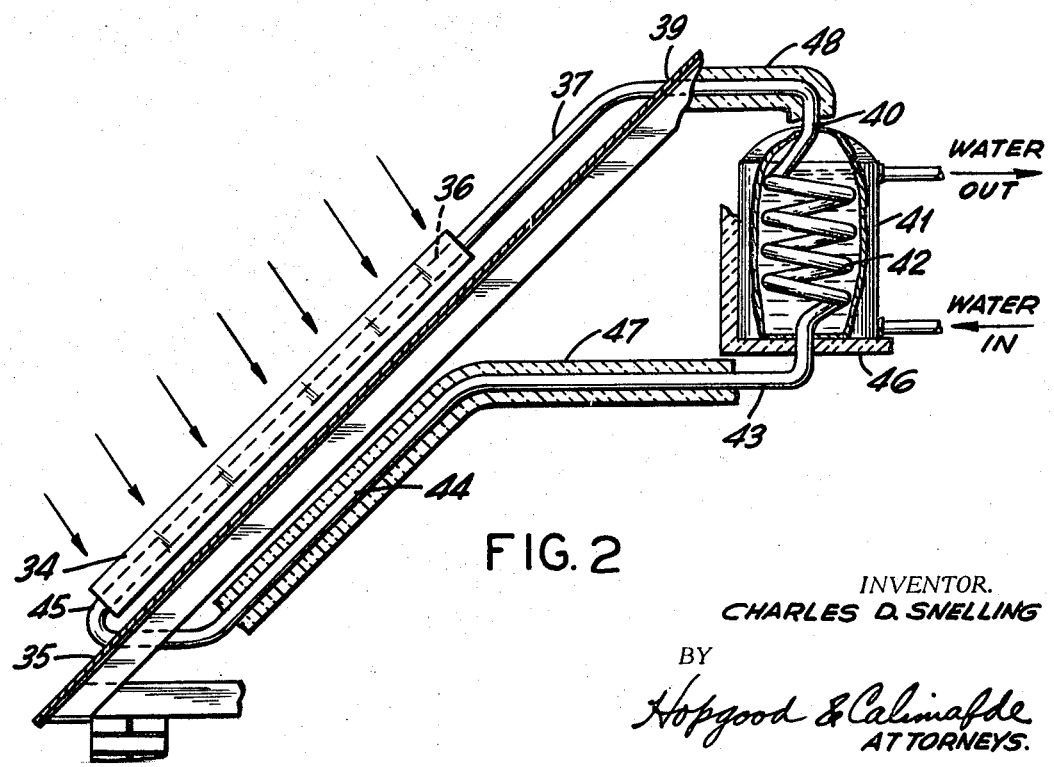

In FIG. 2, I show another modification of my invention in which a pump is not required to insure flooding of the evaporation zone with the vaporizable heat-transfer fluid. In this instance, the means to insure flooding is a gravity leg or trap lying below the water tank. In FIG. 2, a collector 34 is shown associated with roof 35. The evaporator zone may comprise a zig-zag arrangement of tubing 36 which is part of and coextensive with a hermetically sealed heat-transfer circulating system comprising a tubing 37 emerging from the collector and passing through the house at 39 and entering a hot water tank 41 and 40 in communication with coiled tubing or heat exchanger condenser 42. The exit end of the condenser communicates with tubing 43 which terminates into a gravity leg or trap 44 below the water tank, which leg communicates with the collector at 45 on the roof. Preferably the pipe lines in the house and the water tank should be insulated as shown fragmentarily by insulation 46, 47 and 48. The vapor passes one way to the heat exchanger via pipe 37 while the gravity leg serves as a trap or stop in the other direction. As is apparent, the embodiment shown in FIG. 2 is self-operable so long as the amount of fluid hermetically sealed in the circulation system is just sufficient to fill up leg or trap 44 and evaporation zone 36 in the solar collector. As stated above, so long as the temperature at the collector is higher than the temperature in the circulating system within the house, the fluid will boil, evaporate and transfer its latent heat to the heat exchanger. The structure shown in FIG. 2 by its very nature prevents flow of heat to outside the house.

Embodiments of other types of solar collectors are shown in FIGS. 5 to 7. Preferably the material of construction of the evaporation zone should be a good heat conductor so as to insure rapid transfer of the absorbed sun's rays to the heat-transfer fluid. In FIG. 5, I show what is known in the trade as a flat tube sheet made of two superimposed sheets of aluminum 50 and 51 bonded together at their contact faces except for a tortuous pathway 52 shown in dotted lines in FIG. 5 and by the cross section in FIG. 6. The heat transfer fluid enters the evaporator at 53 and exits at 54 as a vapor to the circulating system in the house or other enclosure. The evaporator would preferably be encased in an insulated box with two air-spaced glass panes as shown in FIGS. 3 and 4 and would have an anodized black finish so as to insure a high efficiency of heat absorption.

The solar collector may comprise a parallel arrangement of collector segments 55 to 58 as shown in FIG. 7 with a manifold inlet of fluid at 59 and a manifold outlet for the vapor at 60.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The combination of a solar heater and a heat exchange system comprising a heat-collecting chamber having an evaporation zone associated therewith, a heat exchanger associated with fluid-conducting condensing means, an evacuated heat-transfer circulating system connecting said heat-collecting chamber to said fluid-conducting condenser means in a closed path returning to and communicating with said heat-collecting chamber, and a predetermined amount of vaporizable heat-transfer fluid hermetically sealed in said evacuated circulating system, the heat-collecting chamber being spatially disposed relative to said heat exchanger such that the contained predetermined amount of heat-transfer fluid is just sufficient in the condensed form to flood the evaporation zone of the heat-collecting chamber.

2. The solar heater and heat exchange system of claim 1 including means to insure flooding of said evaporation zone with said predetermined amount of heat transfer fluid.

3. The solar heater and heat exchange system of claim 1 wherein the heat-transfer fluid hermetically sealed therein is adapted to boil over a temperature of about +50 to +250° F. over vapor pressures ranging from about 1 to 200 lbs./in.² absolute.

4. The solar heater and heat exchange system of claim 2 wherein said means for insuring flooding of said evaporation zone comprises pump means coupled to said circulation system.

5. The combination of a solar heater and a heat exchange system as in claim 2 wherein the means for insuring flooding of the evaporator comprises a gravity feeding leg in the circulating system below the heat exchanger with the evaporation zone of the heat collector arranged relative to said leg such that said zone is continually flooded with said heat-transfer fluid.

6. A method of continuously absorbing and controllably utilizing the heat energy of solar radiation which comprises, providing an evacuated circulating system containing a heat-transfer fluid hermetically sealed therein, said system having a solar collector including an evaporation zone exposed to solar radiation in one section thereof and a heat-exchanger condensing means in another section thereof, continuously feeding condensed heat-transfer fluid into the evaporation zone to evaporate the same, and continuously extracting the heat from the evaporated fluid by allowing it to pass through said heat-exchanger condensing means.

7. The solar heater and heat exchange system of claim 1 including means disposed in said circulating system for insuring the circulation of said heat-transfer fluid in only one direction therethrough.

8. The solar heater and heat exchange system of claim 4 wherein is further included switch means in said evaporation zone for actuating said pump means in response to the presence of fluid in said zone.

References Cited

UNITED STATES PATENTS

| 1,425,174 | 8/1922 | Cartter et al, | 126—271 |
| 1,765,136 | 6/1930 | Drane | 126—271 |
| 2,396,338 | 3/1946 | Newton | 126—271 X |
| 3,152,442 | 10/1964 | Rowekamp | 126—271 X |

FOREIGN PATENTS 1,169,114  9/1958  France.

CHARLES J. MYHRE, *Primary Examiner.*